United States Patent [19]

Lieffring

[11] 3,793,663

[45] Feb. 26, 1974

[54] VEHICLE WASH APPARATUS

[75] Inventor: Gordon V. Lieffring, Prairie Village, Kans.

[73] Assignee: Rolo-Wash, Inc., Kansas City, Mo.

[22] Filed: Dec. 6, 1971

[21] Appl. No.: 205,028

[52] U.S. Cl. .............................. 15/21 D, 15/DIG. 2
[51] Int. Cl. ............................................ B60s 3/06
[58] Field of Search........ 15/DIG. 2, 21 D, 21 E, 97

[56] References Cited
UNITED STATES PATENTS

| 3,471,883 | 10/1969 | Ennis | 15/21 D |
| 3,638,265 | 2/1972 | Fuhring | 15/21 D |

*Primary Examiner*—Edward L. Roberts
*Attorney, Agent, or Firm*—Fishburn, Gold & Litman

[57] ABSTRACT

A vehicle washing apparatus having a supporting structure over a vehicle wash position in which a vehicle is parked during washing operations. The apparatus includes top brushes movable longitudinally of the vehicle in side by side paths, the brushes being swingable up and down to engage top surfaces of the vehicle as they are moved therealong. Brushes to engage the sides and ends of the vehicle in the wash position are carried in depending relation to ends of overhead outer arms which have other ends pivotally connected to an end of an inner arm which has its inner end pivotally mounted above the vehicle wash position, there being two sets of arms and side brushes with the inner arms in longitudinally spaced relation and extending in generally opposed directions whereby each operate on a respective side and end portion of the vehicle. The apparatus has sprays for detergents and rinsing liquids to direct same onto the vehicle and power means connected to said inner arms and top brush means to effect movement thereof during washing operation. The apparatus has controls, whereby at the end of the washing cycle the top brushes are raised and the side and end brushes swing outwardly away from the vehicle and are returned to washing position in response to positioning another vehicle in the wash position. Each brush structure travels in one direction to scrub its respective portion of the vehicle, makes a return path thereover and moves away from the vehicle at the end thereof which is the end of the washing cycle.

8 Claims, 12 Drawing Figures

INVENTOR.
GORDON V. LIEFFRING
BY Fishburn, Gold & Litman
ATTORNEYS

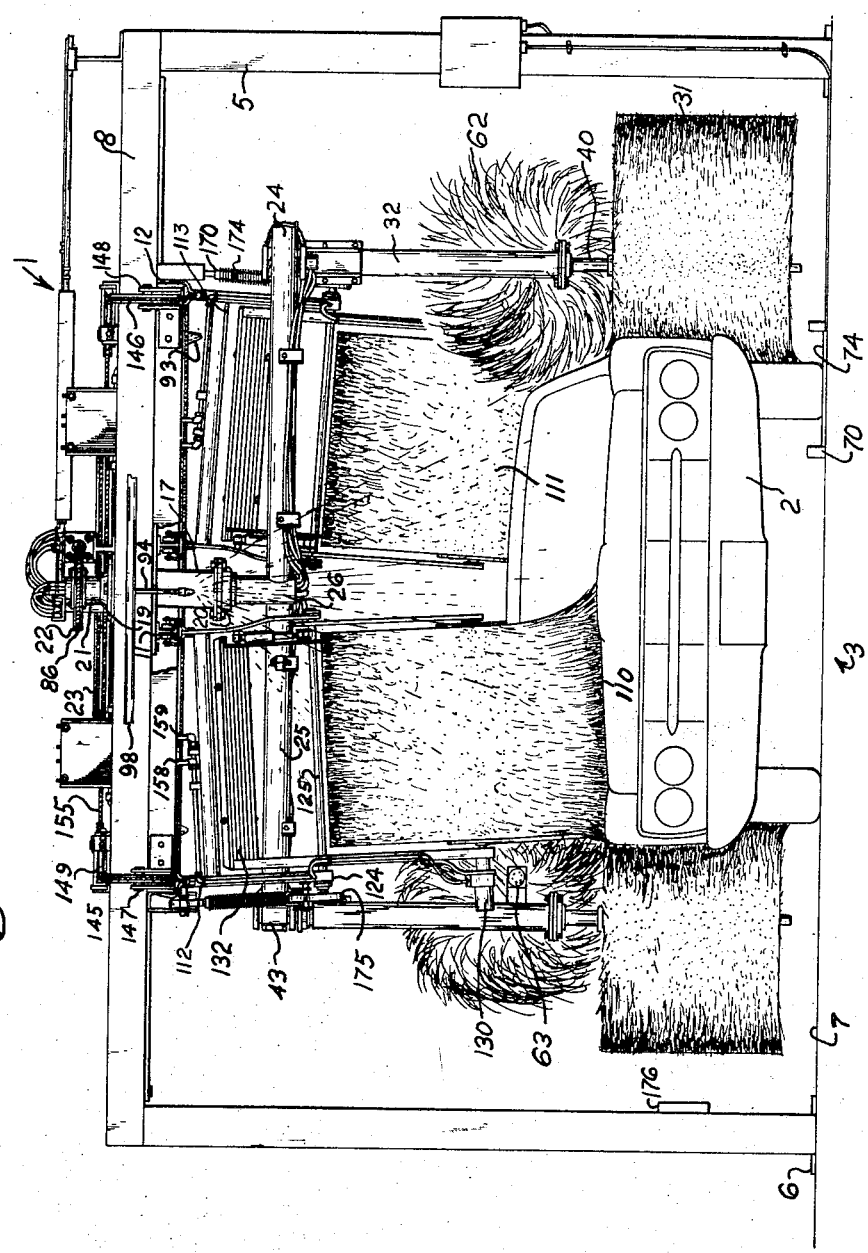

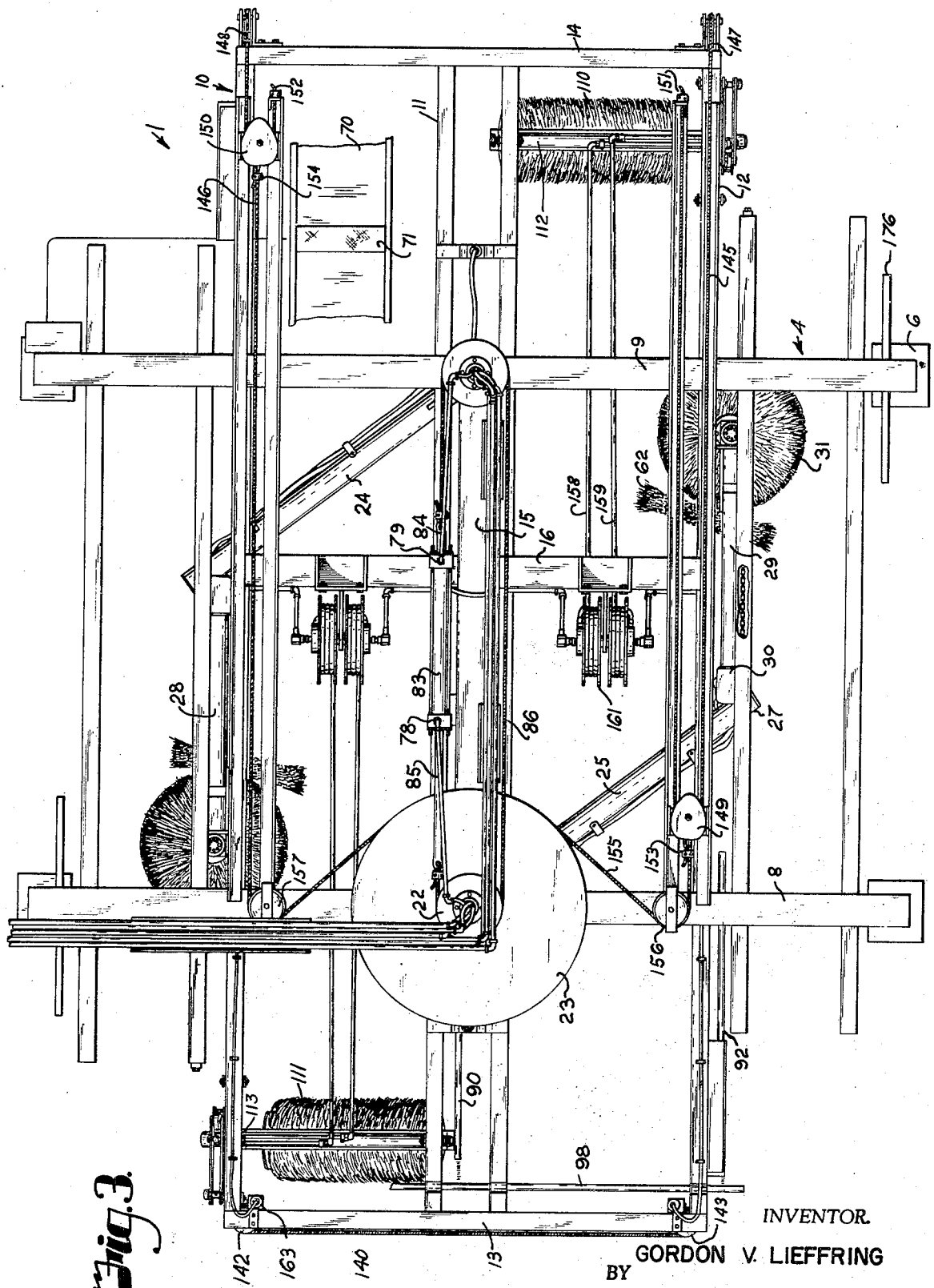

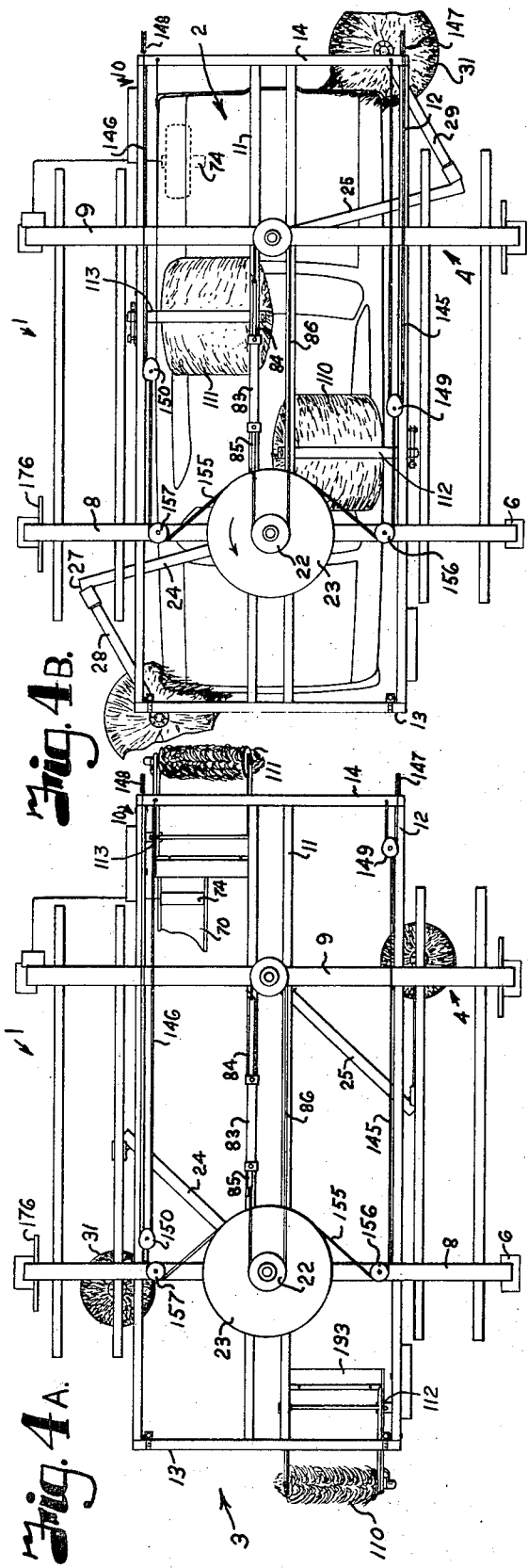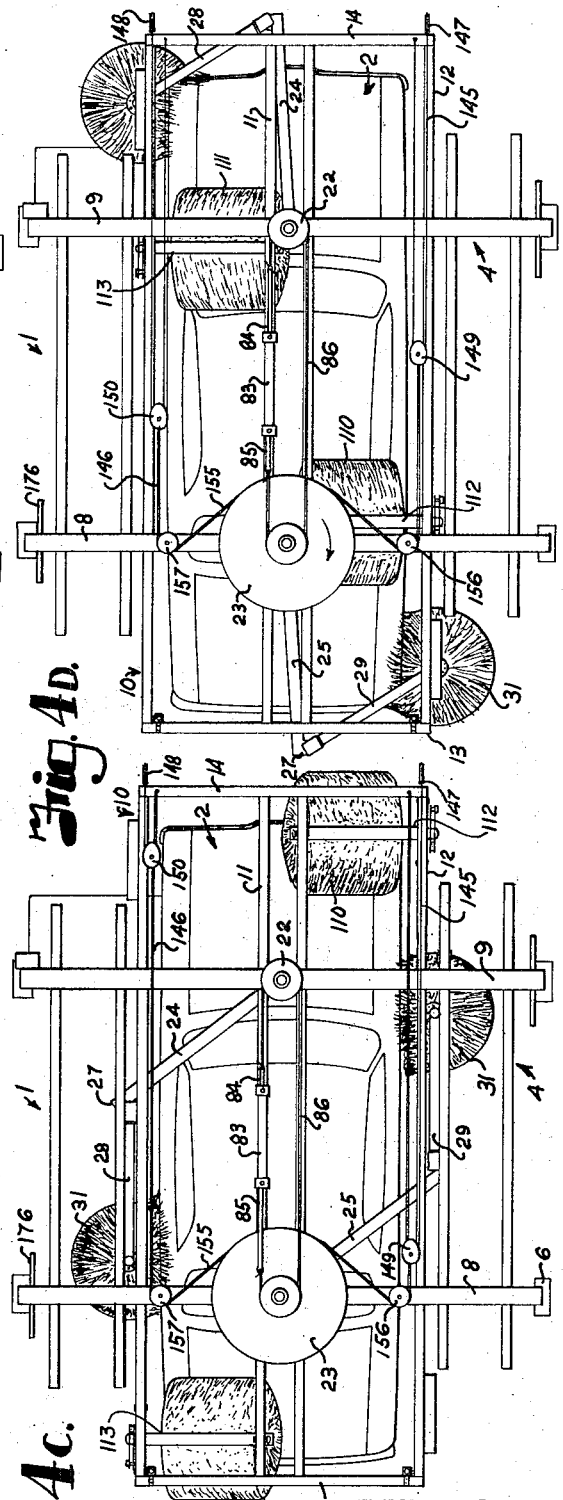

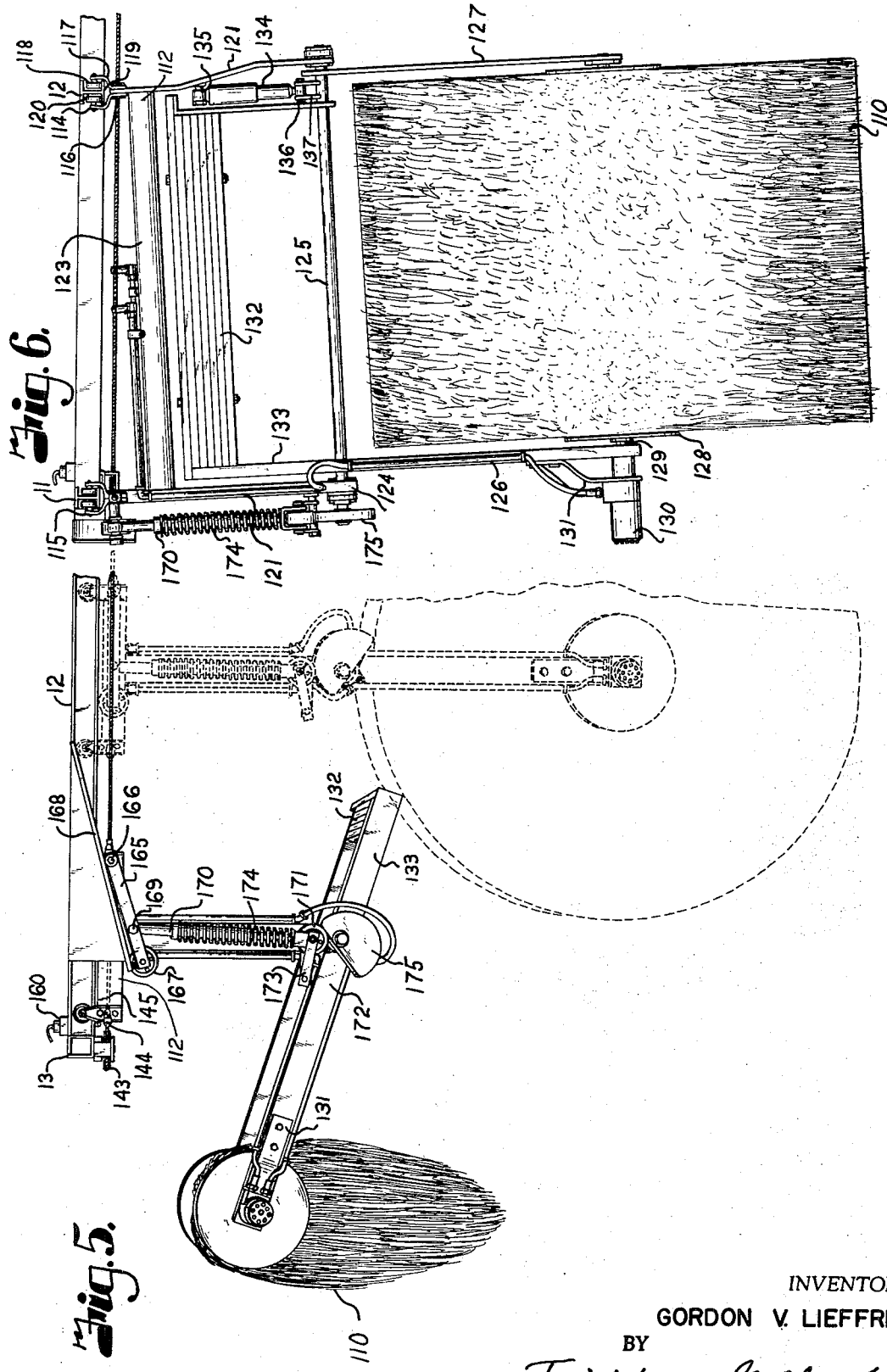

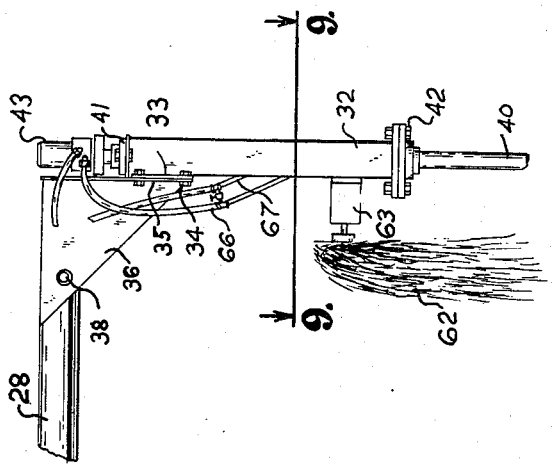
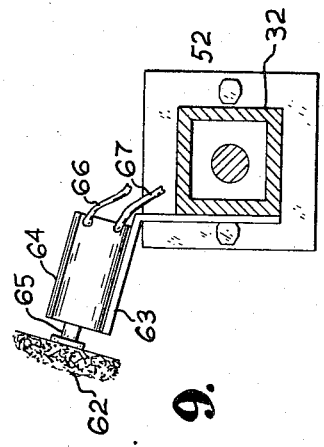
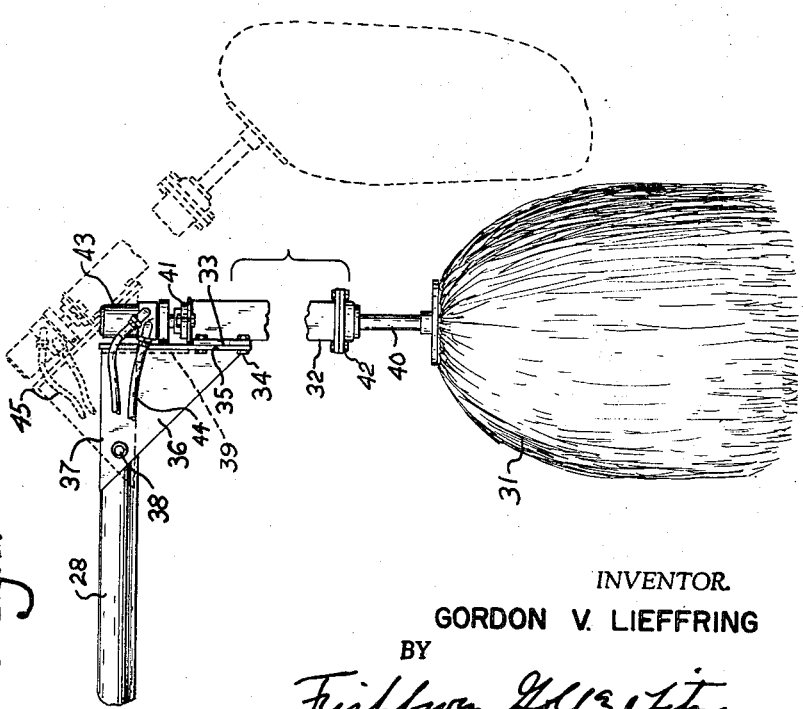
INVENTOR.
GORDON V. LIEFFRING

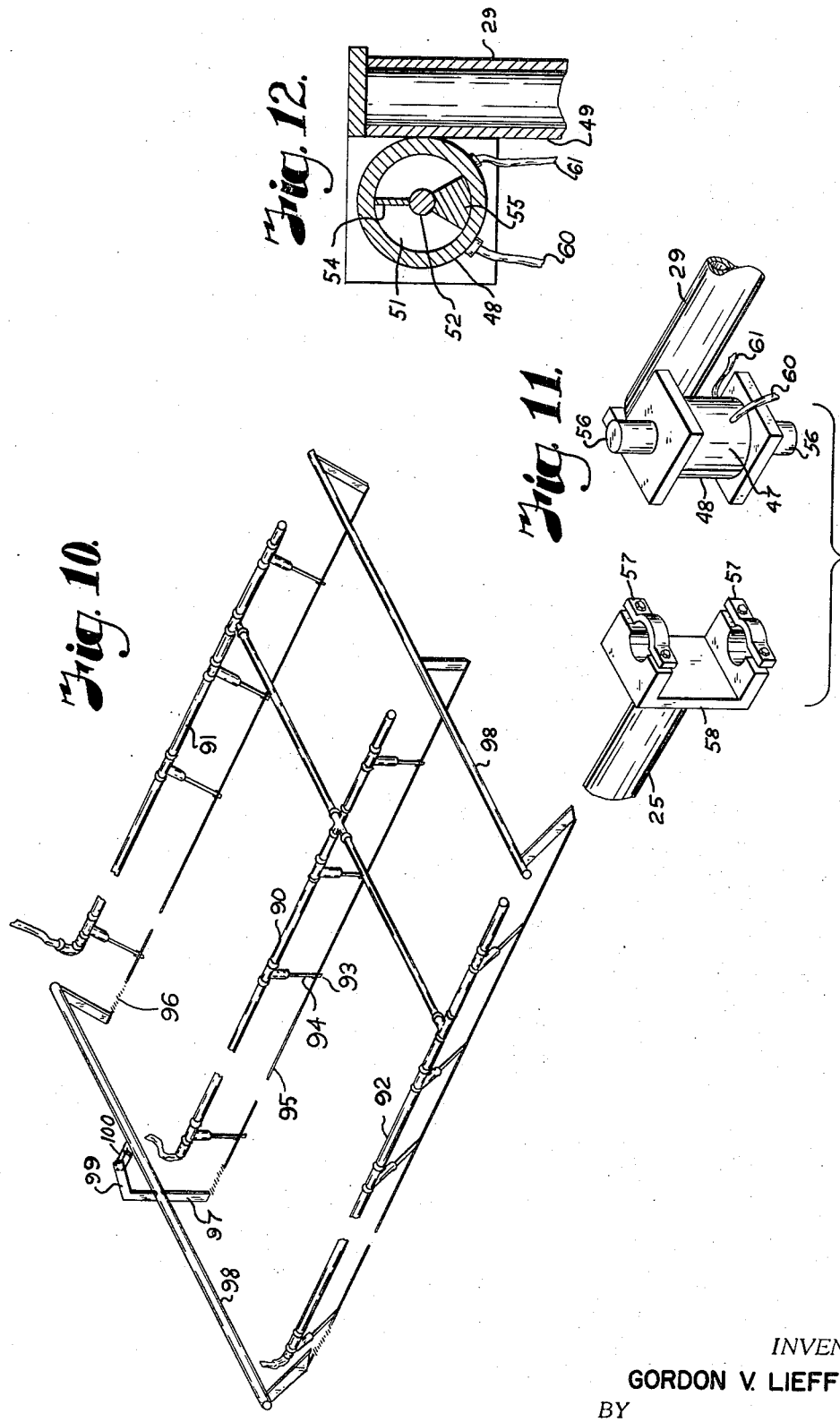

VEHICLE WASH APPARATUS

The present invention relates to apparatus for washing vehicles, such as, automobiles and the like and more particularly to an apparatus utilizing relatively low pressure liquid spray and brushes moved along portions of the vehicle to scrub same during the washing operation.

In the vehicle washing industry, there have been various arrangements of structures having plurality of brushes used with water detergents wherein the brushes are rotated against the vehicle surface to clean same. In some such structures, the brushes are mounted on stationary supports and move in and out of engagement with the vehicle as the vehicle is pulled through a passage between the brushes and other cleaning equipment. There have also been other structures having generally U-shaped or arched members extending over the vehicle and having side and top brushes movably mounted on the arch and engageable with the vehicle as the arch is moved longitudinally of the vehicle. Both forms of brush equipment require substantially floor space and also there is difficulty in accomodating all sizes of vehicles. Direction of rotation of the brushes being constant presents difficulties due to inability to engage the surfaces in corners or areas wherein there are different extents of projection of portions of the vehicle.

The principal objects of the present invention are to provide a vehicle washing apparatus that eliminates the aforementioned difficulties; to provide a vehicle washing apparatus having a plurality of brushes arranged in pairs with each brush of a pair moved simultaneously and oppositively to move over a portion of a vehicle and then returns scrubbing the vehicle surfaces in both directions of travel; to provide such a washing apparatus within a supporting structure extending over a vehicle wash position wherein a vehicle is parked during washing, said structure having track members defining side by side paths for top brush assemblies to move longitudinally of the vehicle and return during washing operation; to provide such a structure wherein the top brushes are swingably mounted on carriages for up and down movement with power means to raise the brushes at the end of the washing cycle to permit the vehicle to pass thereunder; to provide such a structure wherein the top brushes are counter balanced and the weight thereof controls the pressure of the brushes against the vehicle; to provide such a vehicle washing apparatus wherein both a front and rear end of a stationary vehicle receives equal brushing treatment; to provide such a washing apparatus wherein brushes travel in two directions and counter rotate on the return trip; to provide such a washing apparatus that adjusts to each size vehicle automatically; to provide such a washing apparatus wherein all the brushes swing out of the way for clear unobstructed entrance or exit; to provide such a structure wherein the washing apparatus may be supported on spaced columns to be free standing without dependents upon any type of building for support; to provide such a washing apparatus with a pair of inner arms pivotally mounted above the wash position in longitudinally spaced relation and having outer arms pivotally connected to free ends of the inner arm with driven brushes arranged in depending relation into the ends of the outer arms that move along the portion of the sides and ends of the vehicle in response to swinging movement of the inner arm and outer arms thereon, the arms and brushes being arranged generally in opposed relation and movable to wash respective opposed portions of the sides and ends of the vehicle in wash position; to provide such a structure wherein controls move the brush into engagement with the sides of the vehicle at the initiation of the washing cycle and swing the brushes laterally away from the vehicle at the end of the wash cycle; to provide such a washing apparatus with the power means having operative connection with the arms and carriages to effect simultaneous movement of the brushes during the washing operation; to provide such an apparatus wherein power means are operatively connected to each of the brushes to rotate same during washing operation; to provide such an apparatus where the control system including a position indicating member which when engaged by the vehicle initiates the washing operation, said control system stopping the brushes and members at the end of the washing cycle; and to provide a vehicle wash apparatus that is economical to manufacture and use, that is long wearing and efficient in removing soil from a vehicle surface and adapted for a coin operated system so as to be automatic.

Other objects and advantages of this invention will become apparent from the following description taken in connection with the accompanying drawings wherein are set forth by way of illustation and example certain embodiments of this invention.

FIG. 2 is an end elevation of the washing apparatus where the brushes substantially midway in a vehicle washing operation.

FIG. 3 is a plan view of the vehicle washing apparatus with the portions in the position as shown in FIG. 2.

Figure 1:
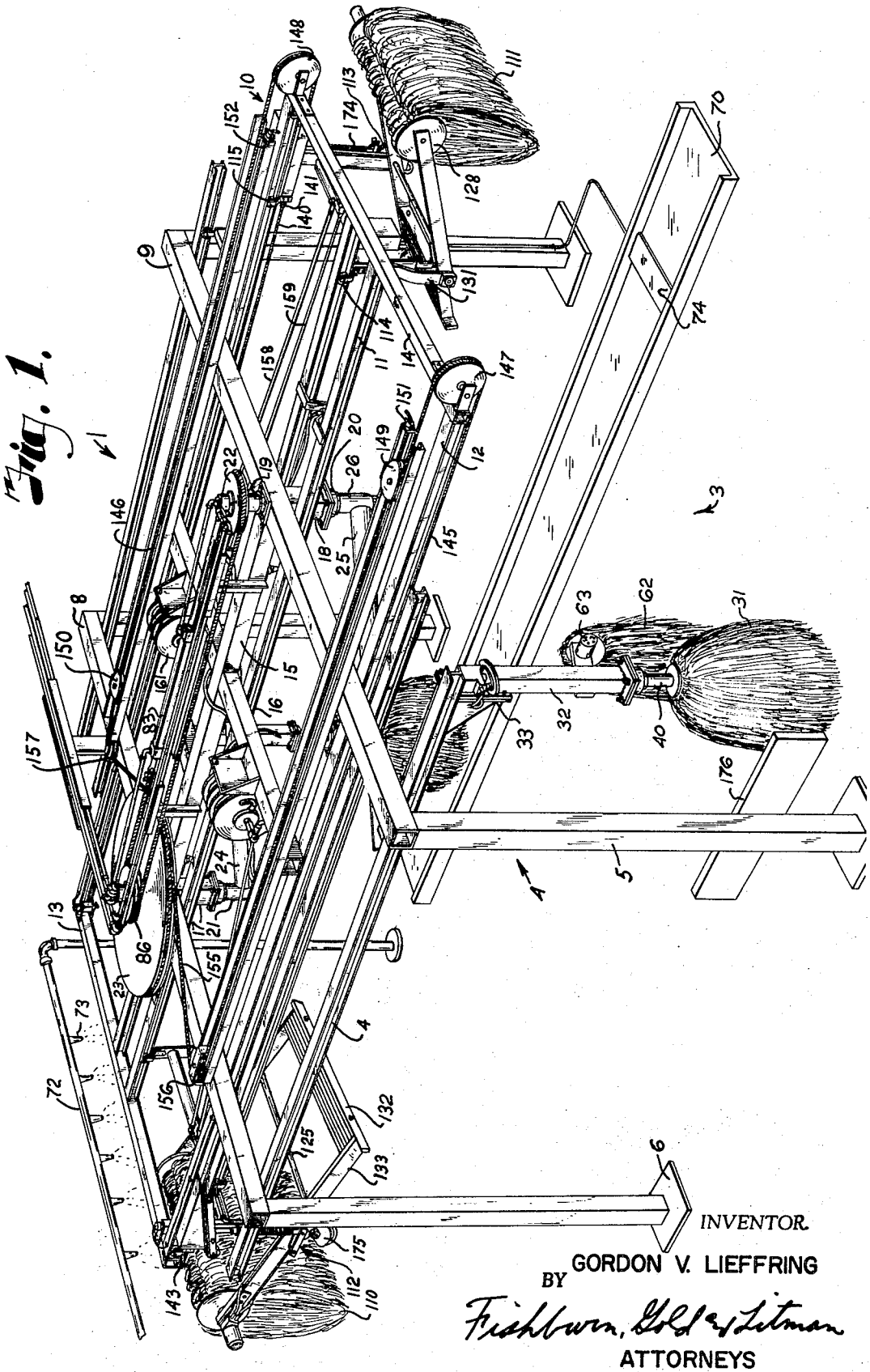
FIG. 1 is a perspective view of a vehicle wash apparatus embodying the features of the present invention.

FIG. 4 a is a diagramatic plan view of the washing apparatus and positioned to receive a vehicle in the wash position.

FIG. 4 b is a diagramatic view of the washing apparatus with the portion thereof in a position after approximately one third of the first pass.

FIG. 4 c is a diagramatic plan view of the vehicle washing apparatus with portions positioned adjacent the end of the movement in one direction prior to starting to return movement.

FIG. 4 d is a diagramatic plan view of the vehicle wash apparatus with a portion shown in the position in approximately one third of the return movement.

FIG. 5 is a partial side elevation of an end of the support structure and a top brush mechanism illustrating the brush raising mechanism at the end of a wash cycle. The brush mechanism being shown in broken lines in a position after starting washing operations.

FIG. 6 is a partial sectional view through the support and an end elevational view of the top brush in washing position.

FIG. 7 is a partial elevational view of the outer arm and side brush depending therefrom with broken lines illustrating the position of the brush and support swung out in response to outward lateral force acting thereon.

FIG. 8 is partial elevational view of a side brush support with a window brush and drive mounted thereon.

FIG. 9 is a sectional view through the side brush support and showing the window brush and drive taken on the line 9—9, FIG. 8.

FIG. 10 is a partial perspective view of top spray nozzles, mountings and operators.

FIG. 11 is a disassembled perspective view of adjacent end portions of the inner and outer arms.

FIG. 12 is a transverse sectional view through the outer arm swinging motor.

Referring more in detail to the drawings:

As required, detailed embodiments of the invention are disclosed herein, however, it is to be understood that these embodiments are merely exemplary of the invention which may be embodied in many forms that are different from the illustrative embodiments presented herein, therefore, specific structural and functional details disclosed herein are not to be interpreted as limiting, but merely as a basis for the claims actually defining the scope of this invention. The disclosure hereof is presented only as a representative basis for teaching one skilled in the art to variously employ the present invention and virtually any detailed structure.

The reference numeral 1 generally designates a vehicle washing apparatus operative to wash and rinse a vehicle 2 located in a vehicle wash position 3. The apparatus is particularly adapted for coin operated installation wherein the vehicle is driven into the wash position and stopped, the apparatus taken proceeding to wash and rinse the vehicle while the occupants remain therein. On completion of the rinsing, the apparatus stops and the vehicle is then free to be driven from the wash location.

In the illustrated washing apparatus, a frame structure 4 is suitably supported over the vehicle wash position. The frame may be suitably supported from walls of an enclosing structure or the like, however, in the illustrated structure 4, there are a plurality of spaced upright columns 5 each having a lower end suitably secured to a base plate 6 mounted on a suitable floor or other supporting surface 7. The upper ends of the columns 5 are connected in pairs by respective transverse beams 8 that extend transversely of the wash position, the columns 5 of each pair being spaced apart sufficiently to provide room for the operating equipment and brushes therebetween to be moved outwardly and provide clearance for a vehicle to move therethrough. This can be provided with the columns arranged within a fourteen (14) foot interior width building. The frame 4 also includes laterally spaced longitudinal members that provide rigidity, and in the illustrated structure, certain of said members also form tracks for brush carriages as later described. In the structure illustrated, the longitudinal members 10 are of suitable structural shapes, such as, I-beams and they are secured under the cross beams 8 in a manner to provide two pairs of tracks having inner track members 11 adjacent to and on opposite sides of the longitudinal center of the frame and outer track members 12 with said longitudinal track members connected at the entry end of the frame by a transverse member 13 and connected at the outlet end of the frame by a transverse member 14, the transverse members being suitably secured to the longitudinal track members to form a rigid structure. To provide further rigidity, the frame 4 has a longitudinal center member 15 extending between and connecting the transverse members 8 along the longitudinal center line and a transverse member 16 is connected to the londitudinal member 15 and extends outwardly therefrom to provide a connection and reinforcement for the track members 11 and 12. The transverse members 8 and 16 and longitudinal member 15 are illustrated as box sections and are located in the same plane whereby the track members 11 and 12 are secured on the under side thereof.

The transverse beams 8 and 9 have tubular bearing support members 17 and 18 respectively fixed thereto and depending therefrom with each having spaced bearing housings 19 and 20 thereon with bearings in said housings to rotatably mount tubular shaft 21. The upper bearing housings 19 are supported on the top of the respective beams 8 and 9 and the lower bearing housings 20 are supported on the end of the support members 17 and 18 and the tubular shafts 21 extend through same with each having a pulley 22 fixed thereto above and in spaced relation to the respective cross members 8 and 9.

In the illustrated structure, the shaft 21 in the support member 17 has a large wheel or sheave 23 fixed thereon between the pulley 22 and the respective upper bearing housing 19. The sheave 23 and the respective pulley 22 are of relative size for effecting movement of the top brushes and side brushes, as later described.

Inner arms 24 and 25 have hubs 26 fixed on ends thereof and sleeved on and secured to the lower end of the tubular shafts 21 projecting below the lower bearing housings 20 whereby turning of the pulley 22 will swing the inner arms 24 and 25, as later described. The arms 24 and 25 extend outwardly to opposed sides of the wash position when in stop position, as illustrated in FIG. 4 a, the arm being toward the entrance end of the structure and angled to the left and forwardly relative to the wash position and the arm 25 being angled rearwardly and to the right of the wash position prior to starting washing operation. The arms 24 and 25 terminates in free ends 27 and are of such length as to extend outwardly beyond the wash position in all points of its movement. Outer arms 28 and 29 have ends 30 pivotally connected to the free ends 27 the pivotal axis being substantially vertical, as later described.

Rotary side brushes 31 are carried by the free ends of the outer arms 28 and 29. The inner arms 24 and 25 and outer arms 28 and 29 are all at a height substantially above the top of the vehicle when in the wash position and the side brushes are arranged to wash the sides, front and rear of the vehicle, therefore, the brushes are spaced below the respective arms.

In the structure illustrated, the brush supports each include a tubular upright member 32 with an upper portion secured by flanges 33 and suitable fastening devices 34 to an upright plate member 35 provided with spaced bracket portions 36 arranged to receive the outer end portion 37 of the outer arms therebetween. The brackets 36 are pivotally mounted on the outer arms by suitable pivot pins 38 spaced from the end of the respective outer arm, as illustrated in FIG. 7. The outer arms have plates or stops 39 at the outer ends engaged by the plate member 35 when the upright member 32 is in normal position and the weight of the brush and structure hold the plate in engagement during any normal operating forces acting on the brushes 31, the pivotal arrangement and the stops being such that if an excessive outward force were applied to the brush, as for example, the brush engaging some obstruction or a vehicle being moved into same, the brush and upright member 32 can swing upwardly, as illustrated in the broken lines in FIG. 7 thereby avoiding damaging the vehicle or the washing equipment.

In the illustrated structure, the brushes 31 are each of a conventional vehicle wash brush construction having fibers of synthetic resin secured to a suitable core and mounted on a shaft 40 that is rotatably supported in bearings mounted in bearing housings 41 and 42 at the upper and lower ends of the upright member 32. The shaft 40 of each unit is operatively connected to suitable driving mechanism to rotate the brush and while any suitable drive may be used, in the illustrated structure, the driving mechanism is a hydraulic motor 43 supported on the plate 35 and engaged with the shaft 40 to rotate same in response to hydraulic pressure supplied through pressure lines 44 and 45 that extend along the respective outer arms 28 and 29 pass the pivotal connection with the inner arm and along the inner arm to the lower end of the respective hollow shaft 21 and upwardly therethrough where they are connected to pressure pipes extending from controls and a source of fluid pressure that operates all during the washing operation.

Power means is operatively connected between the inner and outer arms to swing the inner arm outwardly away from the vehicle wash position wherein the washing operation is stopped and to urge the outer arm and the brush 31 inwardly whereby the brush engages the vehicle during wash position with suitable pressure between the brush and the vehicle, said pressure resulting in a force that is small and permits the brush and arm to swing outwardly if an obstruction is engaged. In the structure illustrated, a reciprocating type of rotary hydraulic motor 47 has a housing 48 secured to brackets 49 on the outer or free end 50 of the inner arm, as 24 and 25. The housing has a cylindrical bore 51 with an axial shaft 52 extending therethrough and suitably rotated in end housing members 53 that support suitable bearings and seals. A vane 54 is secured to the shaft and by differential pressure applied thereto, the vane will tend to rotate the shaft in the housing. The housing 48 has suitable heads 55 extending inwardly relative to the shaft to limit the rotative movement of the vane and shaft. The shaft has end portions 56 which extend outwardly from the housing which are engaged by end members 57 on a yoke structure 58 fixed to the adjacent ends of the respective outer arms 28 and 29. The ends 57 are secured to the end portions 56 of the shaft 52 whereby the outer arms rotate or swing in response to force acting on the respective vane 54 of the motor 47. Power is supplied to the motor 47 through fluid lines 61 that extend along the inner arm and through the hollow shaft 21 to a control and source of fluid pressure. Hydraulic fluid is used for applying the force to the motor 46, however, it is found that at the start of a washing operation, it is desired to quickly swing the side brush into engagement with the vehicle to be washed and to obtain such quick acceleration and movement a source of air is connected into the supply to the lines 60 to supply the initial swinging movement. This is only a small quantity of air for that one purpose.

To wash the windows of the vehicle, window brushes 62 are rotatably mounted from the respective upright members 32 above the side brushes 31. In the structure illustrated, the bracket 63 is secured to the upright member 32 and extends outwardly at an angle to the line of the outer arm and supports a suitable driving motor 64 which is operatively engaged with a shaft 65 mounting the window brush 62. While the window brush could operate at all times during the washing operation, it is found desirable that it operate only on the return cycle and that the portions of the bristles engaging the window move upwardly so as to avoid damage to radio aerials or the like. The driving motor 64 is preferably hydraulic motor supplied with fluid through lines 66 and 67 which are connected to branches of the flow lines 44 and 45 of the motor 43. The hydraulic fluid is preferably supplied to the brushes whereby the side brushes rotates in one direction doing the first part of the washing cycle and rotate in the opposite direction during the return movement. This could cause the window brush to also rotate in opposite directions, however, the lines 66 and 67 to the motor 64 are provided with check valves and by-passes whereby the pressure line on the return movement of the structure supplies fluid to the motor 64 to drive the window brush.

To operate the side brushes, a vehicle is driven into the wash position and preferably there is a guide track 70 along which the wheels of one side of the vehicle are moved. As the vehicle moves toward the wash position, the front wheel thereof engages a treddle switch number 71 opening a valve controlled by a timer for supplying suitable detergent to pipe 72 arranged in an arch adjacent to the entrance end of the structure and, in the illustrated structure, that is adjacent the end member 13. The pipe 72 has a plurality of spray nozzles 73 that spray the detergent on the vehicle as it moves under the arch to thereby cover the vehicle with a pre-detergent for some soaking as the vehicle moves forwardly. The detergent spray is of a predetermined quantity and it is cut off by a suitable timer.

As the vehicle moves to the wash position, a front wheel engages a treddle member 74 which is operatively connected to an operating circuit through suitable relays to energize pumps in the water supply and hydraulic operating systems. This circuitry effects operation of a motor 76 which drives a pressure pump 77 to supply hydraulic fluid to the pressure lines 78 and 79 connected through reversing valves 80 and 81 to the hydraulic supply for the brush motors 43, 64 and 47. It is also connected to the drive for swinging the arms carrying the brushes. This drive consists of suitable means connected to the pulleys 22 to turn same through a predetermined arc and then reverse the rotation back to the initial position. In the illustrated structure, a hydraulic cylinder 83 is fixed relative to the frame 4 with piston rods 84 and 85 extending outwardly through opposite ends. The piston rods are connected to a piston not shown in the ram to reciprocate therewith. The ends of the rods 84 and 85 are connected to a flexible drive member 86 that is operatively engaged with the pulleys 22. The flexible drive member 86 is preferably a suitable rope or chain engaging the sheave pulleys 22 with said drive member being continuous on one side and extending around the pulleys with the ends at the other side connected to the piston rods 84 and 85. With this arrangement reciprocation of the rods effected by the ram piston turns the sheave pulleys 22 and thereby rotate the tubular shaft 21 and swing the arms 24 and 25 through a selected arc.

Due to the arrangement of the ram and drive member 86, the first movement of the piston rods is toward the entrance end of the apparatus to swing the arm 24 rearwardly and then across the rear to swing the respective outer arm and brush 31 thereon rearwardly thereon along the left side and across the rear and forwardly a predetermined distance on the right side of the vehicle. At the same times, the arm 25 is swung forwardly whereby the outer arm 28 and 29 and brush 31 thereon moves forwardly against the left front side of the vehicle and across the front and then rearwardly on the right side of the vehicle, a predetermined amount, extent of the travel being such that at the end of the first movement the brush carried by the arm 28 and 29 will move beyond the point of first contact of the brush 31 carried by the arm 28, thereby showing that the sides and front and rear of the entire vehicle will be contacted by the brushes. At the end of the stroke of the ram in the cylinder 83, the valves 80 and 81 reverse the application of the fluid, reversing the reciprocation of the ram, so as to turn the pulleys 22 in the opposite direction and return the brushes to the original position. The fluid from the lines 78 and 79 also is connected through the pressure lines to the brush motors to rotate the brushes during the movement about the vehicle and on the return movement, the direction of rotation of the brushes is reversed. This provides movement by the brushes so that recessed spots missed on the first pass due to the bending of the bristles will be contacted by the bristles on the return movement.

The washing apparatus is supplied with a water supply to spray water on the vehicle during the washing. The supply is a low pressure spray that can be arranged in any suitable manner. However, in the structure illustrated, there are a plurality of pipes extending longitudinally of the frame, as for example, there is a pipe 90 directly over the vehicle and suitable side pipes 91 and 92. The pipes each have a plurality of nozzles 93 arranged along the length thereof, said nozzles being carried by flexible ducts 94 communicating with the respective pipes. In order to assure coverage of the vehicle with the spray, each of the flexible ducts 94 are connected adjacent the respective nozzle by elongate members 95 with ends connected through resilient members 96 to arms 97 depending from transverse shafts 98. One of the shafts 98 has an arm 99 connected by a link 100 to a rotating crank or eccentric (not shown) driven by a suitable motor or power member (not shown) to oscillate the shafts 98 and thereby swing the nozzles 93 to effect distribution of the water sprayed therefrom.

During washing of the sides and ends of the vehicle, brushes move across the top surfaces to also wash same. And in the structure illustrated, there are two top brushes moving in longitudinal paths and it is also preferred that one brush move in one direction over the top portion toward one side while the other brush moves over the other top portion toward the other side, the moves being longitudinally of the vehicle in the wash position. In the structure illustrated, brushes 110 and 111 are suitably supported on carriage structures 112 and 113 respectively arranged to move along the respective tracks 11 and 12 for each of the carriages.

The carriages have opposed trolleys 114 and 115 each consisting of an elongate member 116 with spaced upwardly extending arms or yoke member 117 that extend upwardly and support rollers 118 arranged to roll on lower flanges 119 of the track members 11 and 12 which are preferably of H-beam structure whereby the flanges extend outwardly and accomodate a roller on each side of the web 120 thereof whereby the rollers movably support the trolley structures for movement longitudinally of the vehicle or its position. The members 116 each have side frame members 121 secured thereto between the trolley yokes to depend therefrom. The upper portions of the side frame members are secured by a rigid transverse member such as a tubular beam 123 to form a rigid structure. In the illustrated structure, the outer arm 121 extends downwardly and inclines inwardly toward the wash position and the inner arm 122 extends downwardly and is preferably bent whereby the lower portion 123 is offset inwardly permitting the track 11 to be spaced apart and yet provide for the lower extremeties of the carriage and the top brushes to be closely arranged in order to be assured of contacting all of the top surfaces, but also permitting clearance to pass in the respective movements. The arrangement of the carriages are such that the axis of the brushes are also inclined whereby the lower portion of the brushes are spaced only a minimum, the inclination being shown in FIG. 6.

The lower end of the arms 121 and 122 have bearings contained in bearing housings 124 to rotatably mount a shaft 125 having fixed thereon between the members 121 and 122 carriage arms 126 and 127 which depend therefrom and are of sufficient length and spacing to accomodate a large top brush therebetween. The brushes 110 and 111 are mounted suitable cores 128 fixed on shafts 129 which are driven by suitable motors 130. In the structures illustrated, the motors 130 are hydraulic motors and are mounted on respective brackets 131 in fixed relation to the outer arms 126. The brushes 110 and 111 tend to hang in suspended relation from the respective carriage, with the shafts 125 rotatably mounted in the bearings 124 whereby they can swing and thereby move up and down to accomodate the various heights of the top surfaces.

In order to provide for a desired pressure of the brush bristles against the top surfaces, the brushes are counterweighted by having a plurality of weight members 132 carried in spaced relation to the shafts 125 on spaced weight arms 133 that are fixed to the shaft 125 and extend therefrom in a direction opposite from the arms 126 and 127. The weights and the arms 133 are such that they will swing between the frame members 121 and 122 and below the transverse member 123 as illustrated in FIG. 6. Also, there are such that the brush structure is only slightly heavier and thereby the brush contact with the top surfaces is at substantially the desired pressure. In such contact, the brush will be arranged whereby the arms 126 and 127 may approach horizontal as the brush passes over the top and will then swing downwardly slightly as the brush contact the radiator or trunk surface.

To retard the speed of up or down movement of a brush and thereby prevent sudden dropping as it passes off a surface, a retarder 134 is connected between the carriage structure and brush support. In the illustrated structure, the retarder is a hydraulic shock absorber having one end pivotally mounted on a support 135 mounted on the carriage frame member 122 in upwardly spaced relation to the shaft 125. The other end is pivotally connected as at 136 to ears 137 fixed to and extending outwardly from the shaft 125. The shock absorber structure telescopes or expands and contracts to permit desired movement and retards the speed thereof.

The carriages carrying the top brushes may be moved in any suitable manner and it is preferable that top brushes be at opposite ends of the frame structure or at one end of their travel prior to starting the wash operation. It is preferred that the initial movement of the brushes on a side be in the same direction as the initial movement of the side brush on the respective side of the vehicle wash position or as illustrated in FIG. 4 A, the top brush 110 would be on the right hand side of the vehicle wash position and will move forwardly as the brush 31 carried by the arms 25 and 29 moves forwardly to pass around the front of the vehicle. In this manner, the top brush 110 is forwardly of the side brush carried by the arms 24 and 28 as it moves along the right side of the vehicle as illustrated in FIGS. 4 B, 4 C, and 4 D thereby eliminating interference of the brushes under supporting equipment, as the arms 24 and 25 are thereby always out of the path and provide no interference with the movement of the top brushes and carriages thereof. with The top brush moving structure illustrated utilizes pulleys and ropes or cables all arranged whereby the power from the ram cylinder 83 effects all of the bodily movements thereof. The carriage structures for each top brush are connected to a rope or cable 140 which has one end connected as at 141 when the trolley member 116 of the outer carriage frame 121 for the brush 111. The rope 140 extends therefrom longitudinally of the frame structure under one track 12 and around a sheave or pulley 142 supported under the transverse frame member 13. The rope then extends across the end of the support structure and around a sheave or pulley 143 at the other end and under the transverse member 13. Rope then extends longitudinally under the other track member 12 and is connected as at 144 to the outer trolley structure of the carriage supporting the brush 110. The other end of the respective outer trolley portions of the carriages are connected to ropes 145 and 146 that extend longitudinally of the top frame structure and under pulleys or sheaves 147 and 148 mounted on and extending outwardly of the frame transverse member 14. The rope extending upwardly over said sheave pulleys and then toward the rear above the frame structure and around pulley blocks 149 and 150 and back toward the front end of the structure where the ropes 145 and 146 have their other ends secured as at 151 and 152. The pulley blocks 149 and 150 are connected to ends 153 and 154 respectively of a rope 155 which extends from the block 149 longitudinally to the transverse frame member 8 and then around the pulley 156 and then to the large pulley or wheel 23 where the rope makes a complete wrap therearound and around a pulley 157 to the pulley block 150. It is to be understood that the ropes 140, 145, 146 and 155 may be suitable, flexible, elongate member serving to transmit the power, as for example, chains or the like. Also the pulleys could be sprockets.

With this arrangement of connections, operation of the ram to move the piston rods 84 and 85 relative to the cylinder 83 will rotate the wheel 23 whereby when rotated in one direction, as for example, counter clockwise, FIGS. 3 and 4 A will apply force that will pull the pulley block 149 toward the pulley 156. This applies a pull on the rope 145 which is transmitted to the carriage for the brush 110 to move same toward the front of the wash position. As the carriage moves, it also applies a pull to the rope 140 which is transmitted through the runs extending around the pulleys 143 and 142 to the carriage for the brush 111 pulling said carriage toward the rear of the wash position. This in turn pulls on the rope 146 operating over the pulley 148 pulling the block 150 toward the pulley 148 thereby pulling the rope 145 from the wheel 23 over the pulley 157.

On the return movement, the piston rods are moved in the opposite direction from the cylinder 83, the ropes apply the force to move the carriages for the return trips. During such movement, the motors 130 are driven by hydraulic fluid pressure provided from the pump 77 and through the lines 78 and 79 which are connected through hoses 158 and 159 wound on reels 161 rotatably mounted on the frame cross member 16 which hoses are connected to flow lines 162 and 163 on the carriages which have communication with the motors 130. The reels are suitably spring loaded whereby they will pay out the hoses 158 and 159 as the carriages are moved away from the respective reels and will pick up the hoses as the carriages move toward the reels thereby maintaining the hoses above the arms 24 and 25 and prevent any interference in the movement thereof.

Any suitable controls for reversing the operation of the hydraulic apparatus may be utilized, however, it is preferred that the valves 80 and 81 be solenoid valves connected in a circuit having switches 160 with a control arm engaged by a portion of the carriage of the brush 110 when it is at the end of its washing movement to interrupt the circuit to the pump and the entire apparatus whereby the structure will remain inoperative until the circuitry is again arranged for operation by coins being placed in a coin control or other main switch operation to bypass the switch 160 and activate the circuit and the pumps and brushes would then operate until reversed and in the structure illustrated, a switch 164 has an operating arm in a position to be engaged by the carriage of the brush 111 when it has reached the end of its rearward travel wherein in position as illustrated in FIG. 3, this switch causes a valve to reverse the flow of hydraulic fluid, thereby reversing the movement of the ram 83 and thereby reversing the travel of all the brushes and reversing the rotation of the brushes, the brushes then returning to their original position in which the carriage of the brush 110 again engages the switch 160 to deactivate the circuitry.

It is desired that the brushes 110 and 111 be swung to a raised position at the end of the washing cycle to thereby present a free, clear opening for persons to drive the vehicle into a washing position. In the structure illustrated, this is performed mechanically with the carriages having an arm 165 with one end pivotally mounted on the carriage structure, as at 166 and a roller 167 on the other end adapted to engage an inclined cam or track 168, the cam 168 being arranged to swing the arm 165 downwardly as the carriage moves to the end of its stroke, as illustrated in FIG. 5. The arm 165 is connected as at 169 to one end of an extensible member, such as a shock absorber 170, which has at its other end a roller 171 mounted on a lever 172 dully supported on a bracket 173 on the outer side arm 121. A spring 174 is sleeved on the shock absorber 170 to apply force to extend same and thereby apply downward force on the roller 171 which engages an eccentric cam member 175 fixed on the respective shaft 125. The force of the spring and the roller 171 against the cam surface is such that it overcomes the weight of the brush and swings same upwardly and retains same in a raised position, as illustrated in FIG. 5 until the apparatus is again activated to move the carriage whereby the roller 167 will again move up the cam 168 and permit the brush to swing downwardly.

In operating a wash apparatus such as described, the vehicle is then driven into the path to the wash position and as it moves therealong it trips the treddle switch 71 causing detergent to be sprayed through the nozzles 73 to provide a suitable covering of detergent over the vehicle surfaces. As the vehicle passes into the wash position, the timing switch shuts off the flow of the detergent, then the wheel of the vehicle strikes a treddle switch 74 as it moves to the wash position and the vehicle then is stopped and the control circuitry causes the motor 76 to drive the pump 77 supplying hydraulic fluid and also operates the valves for the water supply to supply water to the nozzles to spray water on the vehicle as it is being washed. The valves 80 and 81 are operated for a flow of hydraulic fluid to drive motors for the brushes to rotate same and also supply fluid pressure to the ram cylinder 71 moving the piston therein to rotate the pulleys 22 and the wheel 23 in a counter-clockwise direction, FIG. 4 A, moving the ropes to move the top brushes 110 and 111 toward the opposite ends of the apparatus and simultaneously move the arms 24 and 25 to start bodily movement of the brushes 30 around the vehicle. At this initial point, air is supplied to the motor 47 to swing the side brushes inwardly against the vehicle with the hydraulic force maintaining and engaged thereafter during the washing cycle. As the carriage is moved longitudinally of the wash position, the rollers 167 move upwardly on the respective cam tracks 168 reducing the spring pressure of the spring 174 against the cams 175 permitting the top brushes to swing downwardly whereby they will engage the top surfaces of the vehicle, said brushes being rotated as they move. In this manner, water is sprayed on the vehicle and the brushes contact all surfaces thereof as they move through the initial or first pass over the vehicle. At the end of that pass, the carriage for the brush 111 engages the control of the switch 163 to change the valves 80 and 81 to reverse the flow of the hydraulic fluid thereby reversing the direction of movement of the piston rods 84 and 85 of the ram 83 which reverses the direction of the movement of all of the brush mountings. It also reverses the direction of the rotation of the motors driving the sides and top brushes so that their direction of rotation is reversed. On this reversal fluid is supplied to the motors for the window brushes so rotate same whereby they will clean the windows on the return movement of the washing apparatus and at the end of the movement, the carriage of the brush 110 strikes the control 161 of the switch 160 to interrupt the circuit and stop all operation. Also at the end of this movement, the top brushes are raised and the side brushes swing outwardly against stops 175 on the column 5 leaving a clear path whereby the vehicle can then be driven forwardly out of the wash position.

The operation of the brushes is such that they engage all of the surfaces to remove any scum, road film or the like whereby the vehicle has clean surfaces. Also, the apparatus is such that it can be placed in an ordinary size room, such as a space used for grease bay and filling station and it will wash the vehicle in one minute with a minimum of water and detergent.

It is to be understood that while I have illustrated and described certain forms of my invention, it is not to be limited to these specific forms or arrangement of parts herein described and shown.

What I claim and desire to secure by Letters Patent is:

1. A vehicle washing apparatus comprising:
   a. a supporting structure having a frame extending over a vehicle wash position, said frame extending longitudinally relative a vehicle in said wash position;
   b. a spaced inner arm having one end pivotally mounted on the frame about a vertical axis substantially on the transverse center of said wash position, said inner arm normally extending to one side of said wash position, said inner arm having a free end;
   c. an outer arm pivotally mounted at one end on a free end of said inner arm and having a free end;
   d. a rotary side brush;
   e. means supporting said rotary side brush from adjacent the free end of said outer arm;
   f. means for rotating said rotary side brush;
   g. power means operatively connected to said one end of said inner arm to swing same in a respective arc to move the outer arm and side brush around a portion of a vehicle in the wash position and return said arms and brush to starting position; and
   h. a reciprocating rotary power means having one of a housing and vane connected to the outer arm adjacent said one end thereof and having the other of the housing and vane connected to said inner arm adjacent said free end thereof, said reciprocating rotary power means being operative in response to differential pressure acting on said vane to swing the outer arm on the inner arm and move the rotary side brush into operative engagement with a vehicle in the wash position.

2. A vehicle washing apparatus comprising:
   a. a supporting structure having a frame extending over a vehicle wash position;
   b. spaced inner arms pivotally mounted at one end about respective axes spaced apart longitudinally relative a vehicle in said wash position, one of said inner arms normally extending to one side and the other of said inner arms extending to the other side of said wash position, said inner arms each having a free end;
   c. outer arms each pivotally mounted at one end on a free end of a respective inner arm and having a free end;
   d. rotary side brushes;
   e. means supporting a rotary side brush from adjacent the free end of each outer arm;
   f. means for rotating said rotary side brushes;
   g. power means operatively connected to said one end of the inner arms to swing same in a respective arc to move the outer arms and side brushes around a portion of a vehicle in the wash position and return same to starting position; and
   h. a reciprocating rotary power means for each outer arm with each said power means having one of a housing and vane connected to the respective outer arm adjacent said one end thereof and having the other of said housing and vane connected to the respective inner arm adjacent said free end thereof, said reciprocating rotary power means each being operative in response to differential pressure acting on the vane thereof to swing the respective outer arm on the respective inner arm and move the respective rotary side brushes into operative engagement with a vehicle in the wash position.

3. A vehicle washing apparatus comprising:
   a. a supporting structure having a frame extending over a vehicle wash position, said frame extending longitudinally relative a vehicle in said wash position;
   b. a spaced inner arm having one end pivotally mounted on the frame about a vertical axis substantially on the transverse center of said wash position, said inner arm normally extending to one side of said wash position, said inner arm having a free end;
   c. an outer arm pivotally mounted at one end on a free end of said inner arm and having a free end;
   d. a rotary side brush;
   e. means supporting said rotary brush from adjacent the free end of said outer arm;
   f. means for rotating said rotary side brush;
   g. a second rotary brush;
   h. means supported by said outer arm carrying said second rotary brush, said second rotary brush being above and offset toward the wash position from said rotary side brush to engage vehicle windows as the rotary side brush engages vehicle portions below said windows;
   i. means operatively connected to said second brush to rotate same;
   j. power means operatively connected to said one end of said inner arm to swing same in a respective arc to move the outer arm and side brush around a portion of a vehicle in the wash position and return said arms and brush to starting position; and
   k. means connected to the outer arm and operative during swinging movement of the inner arm to effect relative movement of the inner and outer arms for movement of the brush into contact with a vehicle in the wash position.

4. A vehicle washing apparatus as set forth in claim 3 and including:
   a. means operative to apply a detergent to a vehicle to be washed; and
   b. means supported from said frame and operative to spray water on to vehicle surfaces as the arms swing and the brushes rotate in engagement with vehicle surfaces.

5. A vehicle washing apparatus as set forth in claim 4 wherein:
   a. said means operative to rotate said rotary side brush and the second rotary brush are hydraulic motors.
   b. said hydraulic motor rotating the rotary side brush turning same in one direction during swinging movement of the arms in a first direction and turning same in a reverse direction during return swinging movement of the arms in a first direction and turning same in a reverse direction during return swinging movement of said arms; and
   c. said hydraulic motor rotating said second rotary brush operating only on the return swinging of the arms and turning said second rotary brush with the portion toward the vehicle wash position moving downwardly.

6. A vehicle washing apparatus comprising:
   a. a supporting structure having a frame extending over a vehicle wash position;
   b. spaced inner arms pivotally mounted at one end about respective axes spaced apart longitudinally relative a vehicle in said wash position, one of said inner arms normally extending to one side and the other of said inner arms extending to the other side of said wash position, said inner arms each having a free end;
   c. outer arms each pivotally mounted at one end on a free end of a respective inner arm and having a free end;
   d. rotary side brushes;
   e. means supporting a rotary side brush from adjacent the free end of each outer arm, said means supporting the rotary brushes including:
      1. an elongate upright member in depending relation relative to the free end of the respective outer arms;
      2. bracket means adjacent an upper end of the upright member and extending therefrom longitudinally of the respective outer arm;
      3. pivot means connecting the bracket means and outer arm in spaced relation to the free end of the respective outer arm whereby the upright member is swingable outwardly in a direction longitudinally of the outer arm;
      4. stop means on one of the outer arm and upright member engageable with the other to limit inward swinging movement of the upright member;
      5. a shaft rotatably mounted on the upright member and having the respective rotary brush mounted thereon;
   f. means for rotating said rotary side brushes;
   g. power means operatively connected to said one end of the inner arms to swing same in a respective arc to move the outer arms and side brushes around a portion of a vehicle in the wash position and return same to starting position; and
   h. means connected to the outer arms and operative during swinging movement of the inner arms to effect relative movement of the inner and outer arms for movement of the side brushes into contact with a vehicle in the wash position.

7. A vehicle washing apparatus as set forth in claim 6 and including:
   a. a second rotary brush for each upright member;
   b. means on the respective upright member and extending therefrom for supporting the second rotary brush for rotation on a substantially horizontal axis spaced from the upright member toward the wash position;
   c. said second brush being above and offset from the respective rotary side brush; and
   d. means operatively connected to the second brush to rotate same with the portion adjacent the vehicle wash position moving downwardly relative thereto.

8. A vehicle washing apparatus comprising:
   a. a supporting structure having a frame extending over a vehicle wash position;
   b. spaced inner arms pivotally mounted at one end about respective axes spaced apart longitudinally relative a vehicle in said wash position, one of said inner arms normally extending to one side and the other of said inner arms extending to the other side of said wash position, said inner arms each having a free end;

c. outer arms each pivotally mounted at one end on a free end of a respective inner arm and having a free end;
d. rotary side brushes;
e. means supporting a rotary side brush from adjacent the free end of each outer arm;
f. means for rotating said rotary side brushes;
g. power means operatively connected to said one end of the inner arms to swing same in a respective arc to move the outer arms and side brushes around a portion of a vehicle in the wash position and return same to starting position;
h. means connected to the outer arms and operative during swinging movement of the inner arms to effect relative movement of the inner and outer arms for movement of the side brushes into contact with a vehicle in the wash position;

i. the pivotal mounting of said one end of the inner arms and the power means for swinging the inner arms includes:
   1. a vertical shaft at the respective axis and having a lower end fixed to the said one end of respective inner arm;
   2. bearing means mounted on said frame and rotatably mounting the respective shafts;
   3. a pulley fixed on each of said vertical shafts;
   4. flexible power transmission means engaged with said pulleys; and
   5. power means connected to the flexible power transmission means and operative to move same to rotate the pulleys and swing the inner arms through a selected arc.

* * * * *